US012078624B2

(12) United States Patent
Yonekura et al.

(10) Patent No.: US 12,078,624 B2
(45) Date of Patent: Sep. 3, 2024

(54) SPECTROPHOTOMETER (71) Applicant: SHIMADZU CORPORATION, Kyoto (JP)

(72) Inventors: Takuya Yonekura, Kyoto (JP); Masato Watanabe, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 328 days.

(21) Appl. No.: 17/433,671

(22) PCT Filed: Mar. 12, 2019

(86) PCT No.: PCT/JP2019/009879
§ 371 (c)(1),
(2) Date: Aug. 25, 2021

(87) PCT Pub. No.: WO2020/183595
PCT Pub. Date: Sep. 17, 2020

(65) Prior Publication Data
US 2022/0042956 A1     Feb. 10, 2022

(51) Int. Cl.
*G01N 30/74*     (2006.01)
*G01N 30/02*     (2006.01)
(52) U.S. Cl.
CPC ....... *G01N 30/74* (2013.01); *G01N 2030/027* (2013.01)
(58) Field of Classification Search
CPC .................. G01N 30/74; G01N 2030/027
See application file for complete search history.

(56) References Cited

U.S. PATENT DOCUMENTS 6,369,893 B1    4/2002    Chang
2002/0109844 A1    8/2002    Herbert
(Continued)

FOREIGN PATENT DOCUMENTS

EP        1890182 A2    2/2008
JP    2002-515602 A    5/2002
(Continued)

OTHER PUBLICATIONS

Notice of Allowance for corresponding Chinese Patent Application 201980090130.X, dated Mar. 14, 2023, with English machine translation.

(Continued)

*Primary Examiner* — Jamel E Williams
*Assistant Examiner* — Alex T Devito
(74) *Attorney, Agent, or Firm* — Renner, Otto, Boisselle & Sklar, LLP (57) ABSTRACT

A spectrophotometer (40) includes a sample placement unit (422) in which a sample to be analyzed is placed, a light source unit (411, 412) including a plurality of light sources that irradiates the sample placed in the sample placement unit (422) with light, a detection unit (425) that detects light emitted from the sample (422), a housing (41, 42) that accommodates the sample placement unit (422), the light source unit (411, 412), and the detection unit (425), a storage unit (71) in which information of a temperature value predetermined for each combination of one or a plurality of light sources among the plurality of light sources is stored, a light source designation accepting unit (721) that accepts designation related to a combination of one or a plurality of light sources among the plurality of light sources, a target temperature setting unit (722) that reads a temperature value corresponding to the combination of light sources accepted by the light source designation accepting unit from the (Continued)

storage unit and sets the temperature to the target temperature, and a temperature adjusting unit (416, 417, 426, 427, 723) that maintains a temperature inside the housing at a target temperature.

4 Claims, 3 Drawing Sheets

(56) References Cited

U.S. PATENT DOCUMENTS

| | | | | |
|---|---|---|---|---|
| 2005/0063186 | A1* | 3/2005 | Oda | F21V 29/677 |
| | | | | 362/373 |
| 2006/0121602 | A1 | 6/2006 | King | |
| 2014/0063496 | A1 | 3/2014 | Owa | |
| 2014/0097510 | A1* | 4/2014 | Sugawa | H01L 27/14601 |
| | | | | 438/57 |
| 2015/0219493 | A1* | 8/2015 | Bungo | G01J 3/28 |
| | | | | 356/319 |
| 2015/0276479 | A1* | 10/2015 | Johnson | G01J 3/28 |
| | | | | 702/104 |
| 2019/0017872 | A1* | 1/2019 | Brunson | G01J 3/10 |
| 2019/0047226 | A1* | 2/2019 | Ishikawa | B33Y 50/02 |
| 2020/0116566 | A1 | 4/2020 | Ishihara | |

FOREIGN PATENT DOCUMENTS

| | | |
|---|---|---|
| JP | 2008-519266 A | 6/2008 |
| JP | 2014-48176 A | 3/2014 |
| WO | 1999/060380 A1 | 11/1999 |
| WO | 2006/052682 A2 | 5/2006 |
| WO | WO-2018131256 A1 * 7/2018 | ............ A61B 1/06 |
| WO | 2019/016846 A1 | 1/2019 |

OTHER PUBLICATIONS

International Search Report for corresponding Application No. PCT/JP2019/009879, mailed May 21, 2019.
Written Opinion for corresponding Application No. PCT/JP2019/009879, mailed May 21, 2019.

* cited by examiner

|  | RISING TEMPERATURE OF LIGHT SOURCE CHAMBER | RISING TEMPERATURE OF SPECTROSCOPIC CHAMBER |
|---|---|---|
| TURNING ON BOTH DEUTERIUM LAMP AND TUNGSTEN LAMP | 19°C | 12°C |
| TURNING ON ONLY DEUTERIUM LAMP | 15°C | 9°C |
| TURNING ON ONLY TUNGSTEN LAMP | 5°C | 4°C |

Fig. 5

|  | MAXIMUM RISING TEMPERATURE | RISING TEMPERATURE TO BE USED FOR TEMPERATURE CONTROL (MAXIMUM x 50%) |
|---|---|---|
| LIGHT SOURCE CHAMBER | 15°C | 7.5°C |
| SPECTROSCOPIC CHAMBER | 18°C | 9°C |

Fig. 6

|  | TARGET TEMPERATURE OF LIGHT SOURCE CHAMBER | TARGET TEMPERATURE OF SPECTROSCOPIC CHAMBER |
|---|---|---|
| TURNING ON BOTH DEUTERIUM LAMP AND TUNGSTEN LAMP | ROOM TEMPERATURE + 26.5°C | ROOM TEMPERATURE + 21°C |
| TURNING ON ONLY DEUTERIUM LAMP | ROOM TEMPERATURE + 22.5°C | ROOM TEMPERATURE + 18°C |
| TURNING ON ONLY TUNGSTEN LAMP | ROOM TEMPERATURE + 12.5°C | ROOM TEMPERATURE + 13°C |

SPECTROPHOTOMETER

TECHNICAL FIELD

The present invention relates to a spectrophotometer.

BACKGROUND ART

Liquid chromatographs are widely used to identify and quantify components in a sample. In the liquid chromatograph, components in a sample are separated by a column, and each component is detected. A spectrophotometer is widely used for measuring components in a sample solution eluted from a column.

In a spectrophotometer, a light source irradiates a sample with light, and a spectroscopic element separates the light (transmitted light, fluorescence, and the like) after interaction with the sample into wavelengths to measure the intensity of light of each wavelength. In such a spectrophotometer, for example, a deuterium lamp is used as a light source, and a diffraction grating is used as a spectroscopic element.

Some of the spectroscopic elements included in the spectrophotometer have a spectral characteristic that changes when the temperature changes during measurement. For example, in the case of the diffraction grating, the entire diffraction grating expands and contracts with a temperature change, and an interval between the lines changes, so that the wavelength separation characteristic changes. When the wavelength separation characteristic changes as described above, the measurement accuracy decreases. In a case where a spectrophotometer is used as a detector of a liquid chromatograph, the amount of light absorbed by a mobile phase changes with a temperature change, and drift may occur.

In order to prevent the above problem, many spectrophotometers include a temperature control mechanism for keeping the inside temperature of the spectrophotometer constant regardless of a change in the environmental temperature around the spectrophotometer (for example, Patent Literature 1). The temperature control mechanism includes, for example, a temperature measurement unit that measures a temperature inside the spectrophotometer, a heater that heats the inside of the spectrophotometer, and an output adjustment unit that adjusts an output of the heater.

When a lamp as a measurement light source is turned on when the spectrophotometer is used, heat is generated from the lamp, and the temperature inside the spectrophotometer rises. Therefore, in the spectrophotometer, a target temperature higher than the environmental temperature is set in advance, and the output of the heater is controlled so that the inside of the spectrophotometer is maintained at the target temperature during the measurement of the sample.

CITATION LIST

Patent Literature

Patent Literature 1: JP 2014-48176 A

SUMMARY OF INVENTION

Technical Problem

Some spectrophotometers include a deuterium lamp that emits light in the ultraviolet region and a tungsten lamp that emits light in the visible region in order to be able to measure both a sample that absorbs light in the ultraviolet region and a sample that absorbs light in the visible region. In such a spectrophotometer, one or both of the spectrophotometers are turned on according to light absorption characteristics of the sample when a measurement is performed.

The deuterium lamp and the tungsten lamp generate different amounts of heat during lighting, and thus the temperature rise inside the spectrophotometer is different. Although depending on the inside volume of the spectrophotometer and other factors, in a case where both the deuterium lamp and the tungsten lamp are turned on and in a case where only the tungsten lamp is turned on, the inside temperature of the spectrophotometer may be different by about 15° C.

The amount of heat that can be generated by the heater of the spectrophotometer is limited, and the temperature range that can be controlled by the temperature control mechanism is not so large. In a spectrophotometer including a plurality of light sources, since a large temperature difference as described above may occur depending on the number, type of light sources and their combination used, there is a problem that it is difficult to control the temperature inside the spectrophotometer by setting an appropriate target temperature.

The problem to be solved by the invention is to appropriately control the temperature of the inside of a spectrophotometer including a plurality of light sources regardless of the number, type of the light sources and their combination used for a measurement.

Solution to Problem

A spectrophotometer according to the invention made to solve the above problems includes:
  a sample placement unit in which a sample to be analyzed is placed;
  a light source unit that includes a plurality of light sources, each of which irradiates a sample placed in the sample placement unit with light;
  a detection unit configured to detect light from the sample;
  a housing configured to accommodate the sample placement unit, the light source unit, and the detection unit;
  a storage unit in which information of a temperature value predetermined for each combination of one or a plurality of light sources among the plurality of light sources is stored;
  a light source designation accepting unit configured to accept designation related to a combination of one or a plurality of light sources to be turned on among the plurality of light sources;
  a target temperature setting unit configured to read the information of the temperature value corresponding to the combination of one or a plurality of light sources accepted by the light source designation accepting unit from the storage unit and set the temperature value to a target temperature; and
  a temperature adjusting unit configured to maintain a temperature inside the housing at the target temperature.

Advantageous Effects of Invention

The plurality of light sources may be light sources of the same type or light sources of different types. The combination may include only one light source and a combination of a plurality of light sources.

As the sample placement unit, an appropriate one depending on the shape of the sample is used. For example, in the case of measuring a gas sample or a liquid sample, a flow cell or a standard cell is used as the sample placement unit, and in the case of measuring a solid sample, a sample stage is used as the sample placement unit.

As the temperature adjusting unit, for example, one including a heater that heats the inside of the housing, a temperature measurement unit that measures the temperature inside the housing, and an output adjustment unit that adjusts the output of the heater according to the difference between the temperature measurement unit and the target temperature is used.

The temperature value predetermined for each combination of the plurality of light sources is determined based on a degree of temperature rise inside the housing when each light source is turned on and a temperature adjustable range by the temperature adjusting unit.

The spectrophotometer according to the invention includes a light source unit including a plurality of light sources, and measures a sample by turning on one or a plurality of the light sources according to an absorption characteristic and the like of a sample to be analyzed. In this spectrophotometer, when a combination of one or a plurality of light sources to be used for measurement of a sample is designated prior to measurement, information of a temperature value corresponding to the designated combination of light sources is read from the storage unit and set to a target temperature. During the measurement, the temperature inside the housing is maintained at the target temperature by the temperature adjusting unit.

In the spectrophotometer according to the invention, since the target temperature is set according to the combination of the light sources to be used, the temperature inside the spectrophotometer can be appropriately adjusted regardless of the combination of the light sources to be used for measurement.

DESCRIPTION OF EMBODIMENTS

An embodiment of a spectrophotometer according to the invention will be described below with reference to the drawings. The spectrophotometer of the present embodiment is used for measuring components contained in a sample in a liquid chromatograph.

Figure 1:
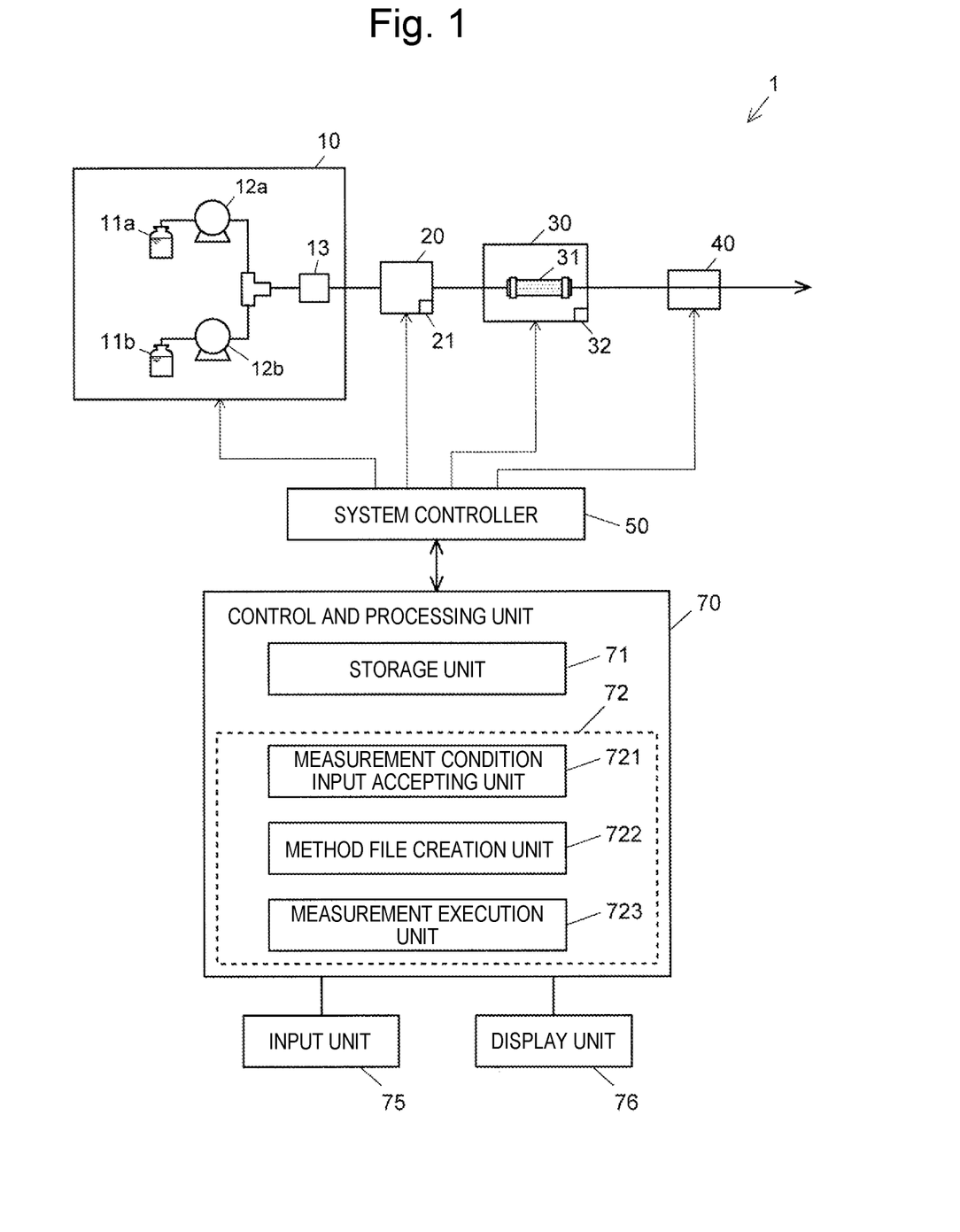
FIG. 1 is a configuration diagram of main parts of a liquid chromatograph including an embodiment of a spectrophotometer according to the invention.

FIG. 1 is a configuration diagram of main parts of a liquid chromatograph 1 including a spectrophotometer of the present embodiment. The liquid chromatograph 1 includes a liquid feeding unit 10, an autosampler 20, a column oven 30, a spectrophotometer 40, a system controller 50, and a control and processing unit 70.

The liquid feeding unit 10 includes containers 11a and 11b that store solutions of mobile phases, liquid feeding pumps 12a and 12b that feed the solutions in the containers 11a and 11b, and a mixer 13 that mixes the two types of solutions. A column 31 is accommodated in the column oven 30.

The mobile phase prepared by the liquid feeding unit 10 is introduced into the column 31 in the column oven 30 via the autosampler 20. In the autosampler 20, one or more liquid samples to be analyzed are set in advance. The inside of the autosampler 20 is maintained at a predetermined temperature by a temperature control mechanism 21 (typically, a cooler) in order to prevent the liquid sample from being volatilized or altered. In the autosampler 20, one or more liquid samples to be analyzed set therein are sequentially injected into the mobile phase. The liquid sample injected into the mobile phase is carried by the flow of the mobile phase and passes through the column 31.

The column oven 30 includes a temperature control mechanism 32 (typically, a heater) for the column 31. Each component in the sample is temporally separated while passing through the column 31.

Figure 2:
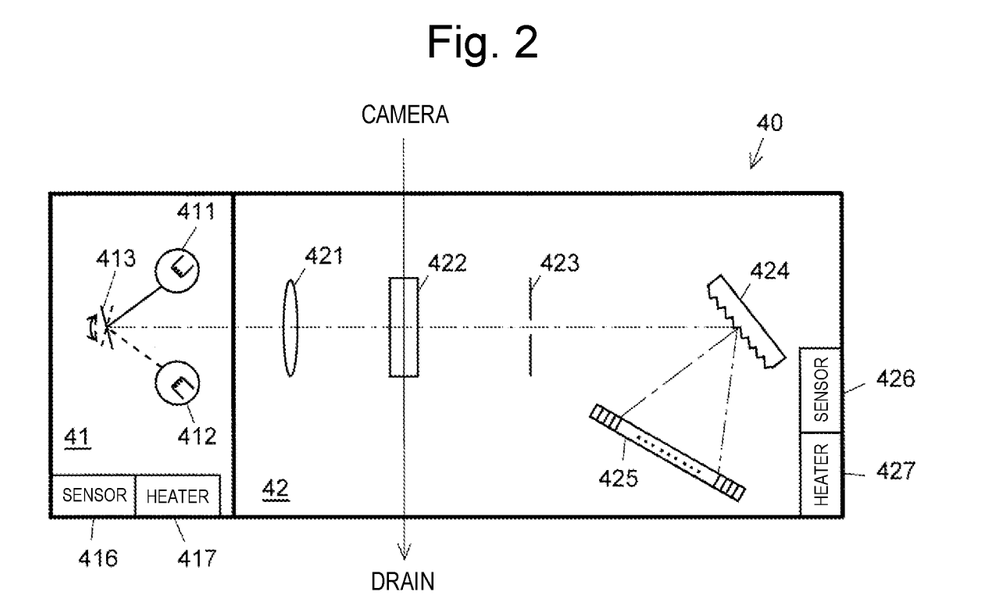
FIG. 2 is a configuration diagram of main parts of the spectrophotometer of the present embodiment.

FIG. 2 illustrates a schematic configuration of the spectrophotometer 40. In a housing of the spectrophotometer 40, a light source chamber (lamp house) 41 and a spectroscopic chamber 42 are provided. Although the light source chamber 41 and the spectroscopic chamber 42 are arranged adjacent to each other in FIG. 2, they may be arranged apart from each other. The light source chamber 41 is provided with a sensor 416 that measures a temperature at a predetermined position in the light source chamber 41 and a heater 417 that heats the inside of the light source chamber 41. The spectroscopic chamber 42 is also provided with a sensor 426 that measures a temperature at a predetermined position in the spectroscopic chamber 42 and a heater 427 that heats the inside of the spectroscopic chamber 42. The sensors 416 and 426 in the present embodiment are thermistors, but an appropriate sensor capable of measuring a temperature may be used. The power supply amount to the heaters 417 and 427 is feedback-controlled by a measurement execution unit 723 of the control and processing unit 70 so that the light source chamber 41 and the spectroscopic chamber 42 are each maintained at a predetermined temperature (target temperature to be described later).

A deuterium lamp 411 and a tungsten lamp 412 are accommodated in the light source chamber 41. By rotating a mirror 413 under the control of the measurement execution unit 723, light from the deuterium lamp 411 and the tungsten lamp 412 is alternatively introduced into the spectroscopic chamber 42. When the components contained in the liquid sample include both a component having high sensitivity to ultraviolet light (component A) and a component having high sensitivity to visible light (component B), both the deuterium lamp 411 and the tungsten lamp 412 are turned on during the measurement, and the mirror 413 is controlled such that a flow cell 422 is irradiated with ultraviolet light in a time period in which the component A is eluted from the column 31 and introduced into the flow cell 422, and the flow cell 422 is irradiated with visible light in a time period in which the component B is introduced into the flow cell 422. When the liquid sample contains only a component having high sensitivity to ultraviolet light, only the deuterium lamp 411 is used (turned on), and when the liquid sample contains only a component having high sensitivity to visible light, only the tungsten lamp 412 is used (turned on). As described above, in the present embodiment, there are three combinations of light sources that can be used (can be turned on).

When both the deuterium lamp 411 and the tungsten lamp 412 are turned on, the flow cell 422 may be irradiated with light from both the deuterium lamp 411 and the tungsten lamp 412 instead of switching by the mirror 413.

In the spectroscopic chamber 42, a condenser lens 421, a flow cell 422, a slit 423, a diffraction grating 424, and a photodiode array 425 are arranged. Components in the sample separated in the column 31 are sequentially introduced into the flow cell 422. The light introduced from the light source chamber 41 is condensed by the condenser lens 421 and applied to the flow cell 422. The light having transmitted the component passing through the flow cell 422 passes through the slit 423, is wavelength-separated by the diffraction grating 424, and then enters the photodiode array 425. Each element constituting the photodiode array 425 outputs a signal corresponding to the amount of light incident at a predetermined sampling time. The output signal from the photodiode array 425 is transmitted to the control and processing unit 70 and sequentially stored in a storage unit 71.

The control and processing unit 70 includes a measurement condition input accepting unit 721, a method file creation unit 722, and a measurement execution unit 723 as functional blocks in addition to the storage unit 71. An entity of the control and processing unit 70 is a general computer, and these functional blocks are embodied by executing an analysis program 72 installed in advance by a processor. An input unit 75 and a display unit 76 are connected to the control and processing unit 70.

The storage unit 71 stores information regarding target temperatures of the light source chamber 41 and the spectroscopic chamber 42 at the time of measurement (when the light source is turned on). Specifically, for each of the three cases of (1) turning on only the deuterium lamp 411, (2) turning on only the tungsten lamp 412, and (3) turning on both the deuterium lamp 411 and the tungsten lamp 412, those in which the target temperatures of the light source chamber 41 and the spectroscopic chamber 42 are individually determined are stored in advance.

The target temperature is determined in consideration of how much the temperature inside each of the light source chamber 41 and the spectroscopic chamber 42 rises due to heat generated when the deuterium lamp and the tungsten lamp are turned on. This point will be described below.

Figure 3:
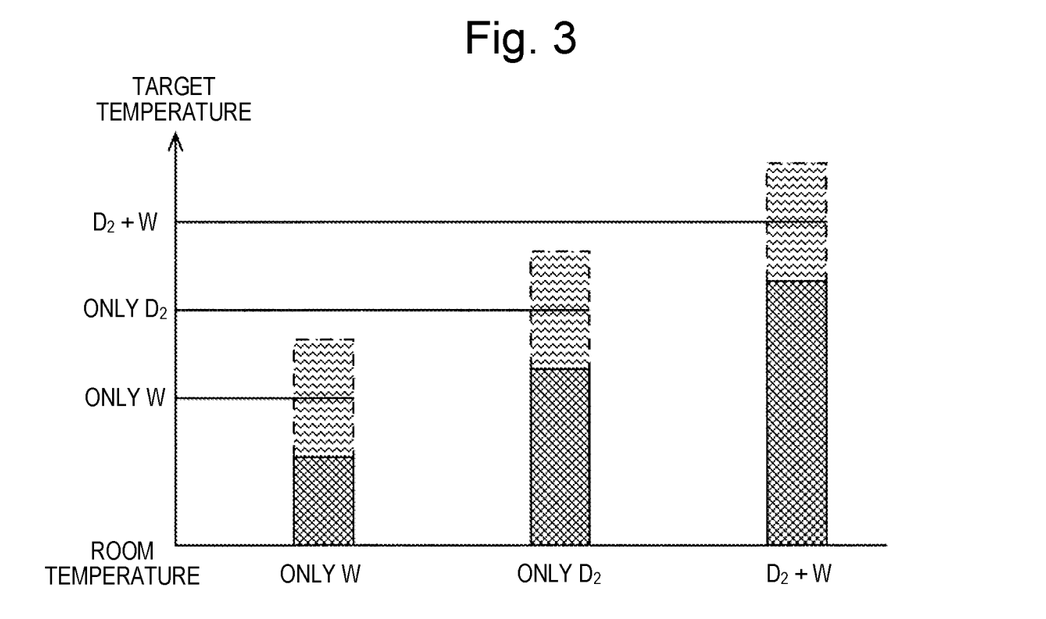
FIG. 3 is a conceptual diagram for explaining how to set a target temperature in the present embodiment.
Figure 4:
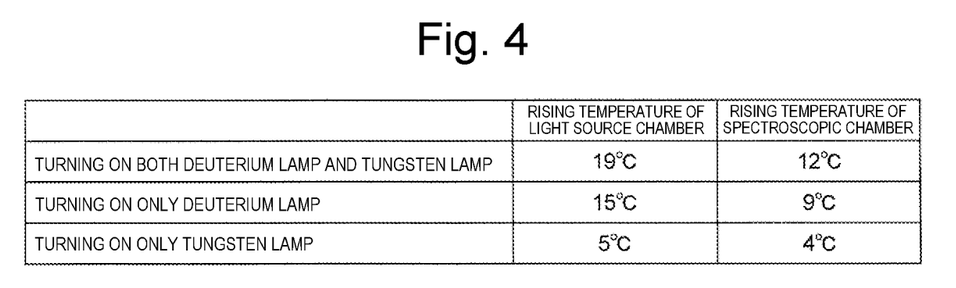
FIG. 4 is a table for explaining a relationship between a combination of lamps to be turned on and rising temperatures of a light source chamber and a spectroscopic chamber.

FIG. 3 is a conceptual diagram for explaining how to set a target temperature. As illustrated in FIG. 3, the calorific value when the light source is turned on increases in the order of when only the tungsten lamp is turned on (W only), when only the deuterium lamp is turned on ($D_2$ only), and when the deuterium lamp and the tungsten lamp are turned on (W+$D_2$). In FIG. 3, these calorific values are indicated by a frame surrounded by a solid line. This indicates a temperature rise in the light source chamber 41 and the spectroscopic chamber 42 from the environmental temperature (room temperature) before the lamp is turned on (at the time of device activation) after the lamp is turned on. FIG. 4 illustrates a rising temperature when the light source is turned on in the present embodiment.

Figure 5:
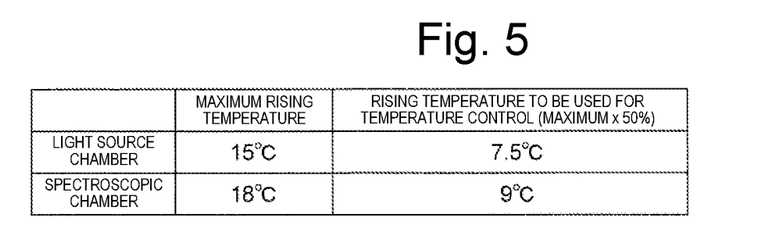
FIG. 5 is a table for explaining rising temperatures of the light source chamber and the spectroscopic chamber when a heater is used.

Next, the rise temperatures of the light source chamber 41 and the spectroscopic chamber 42 when the energization amounts to the heaters 417 and 427 provided in the light source chamber 41 and the spectroscopic chamber 42, respectively, are maximized after the light source is turned on are considered. In FIG. 3, the possible heat generation amount of the heater is indicated by a frame surrounded by a broken line. That is, it indicates how many degrees the light source chamber 41 and the spectroscopic chamber 42 rise at the maximum while each light source is turned on. The target temperature when each lamp is turned on is set by the temperature of a predetermined ratio (50% in the present embodiment) with respect to the rising temperature (maximum rising temperature) of the light source chamber 41 and the spectroscopic chamber 42 when the energization amount to the heaters 417 and 427 is maximized. FIG. 5 illustrates a rise temperature (maximum temperature rise and temperature corresponding to 50% thereof) due to energization of the heater in the present embodiment.

Figure 6:
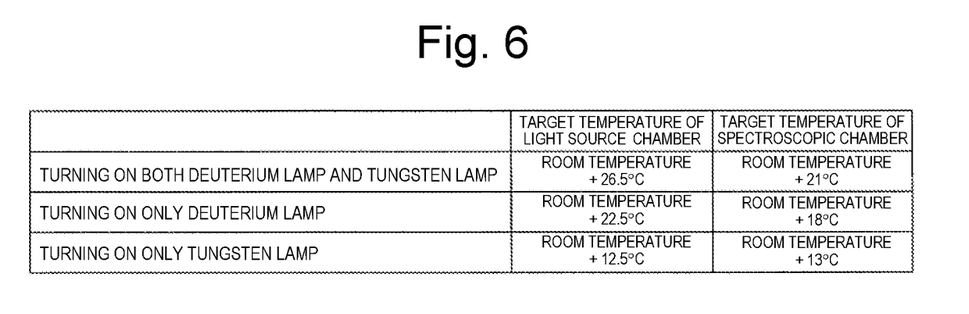
FIG. 6 is a table illustrating a relationship between a combination of lamps to be turned on and target temperatures of the light source chamber and the spectroscopic chamber.

A list of target temperatures determined using the numerical values illustrated in FIGS. 4 and 5 is illustrated in FIG. 6. When both the deuterium lamp 411 and the tungsten lamp 412 are turned on, the target temperature of the light source chamber 41 is room temperature +26.5° C., and the target temperature of the spectroscopic chamber 42 is room temperature +21° C. When only the deuterium lamp 411 is turned on, the target temperature of the light source chamber 41 is room temperature +22.5° C., and the target temperature of the spectroscopic chamber 42 is room temperature +18° C. When only the tungsten lamp 412 is turned on, the target temperature of the light source chamber 41 is room temperature +12.5° C., and the target temperature of the spectroscopic chamber 42 is room temperature +13° C. In the present embodiment, the target temperature is set as a relative temperature with respect to room temperature, but the target temperature may be set as an absolute temperature in a case where the spectrophotometer is used in an environment where a change in room temperature is small.

Next, a flow of measurement using the liquid chromatograph 1 of the present embodiment will be described. Here, in the flow of measurement, only characteristic steps in the present embodiment will be described, and description of the same procedure and details of measurement as in the related art will be omitted.

When the user performs a predetermined operation using the input unit 75, the measurement condition input accepting unit 721 displays a screen for allowing the user to input the measurement condition on the display unit 76. The measurement conditions include designation of a light source (the deuterium lamp 411, the tungsten lamp 412) to be used at the time of measurement. In addition, the measurement conditions include the type and flow rate of the mobile phase, the temperature of the column oven 30, the sampling interval at which data is acquired in the spectrophotometer 40, and the like. These measurement conditions can be input by a user inputting them in an input field displayed on the display unit 76. When the user inputs measurement conditions, the method file creation unit 722 creates a method file describing the measurement conditions. The method file creation unit 722 reads information of the temperature value corresponding to the combination of the light sources designated by the user from the storage unit 71, sets the target temperatures of the light source chamber 41 and the spectroscopic chamber 42, writes the value in the method file, and stores the value in the storage unit 71. Note that, in a case where a method file is stored in the storage unit 71 in advance, an operation of inputting a measurement condition by reading the method file can be substituted. In this case, the measurement condition input accepting unit 721 sets the target temperatures of the light source chamber 41 and the spectroscopic chamber 42 based on the type of the light source described in the read method file.

When the method file is created and the user instructs to start the measurement by a predetermined operation, the measurement execution unit 723 measures the sample based on the measurement conditions described in the method file. The measurement execution unit 723 measures the temperatures of the light source chamber 41 and the spectroscopic chamber 42 at the time of device activation (before turning on the deuterium lamp 411 and the tungsten lamp 412) using the sensor 416 of the light source chamber 41 and the sensor 426 of the spectroscopic chamber 42, respectively. Then, the absolute values of the target temperatures of the light source chamber 41 and the spectroscopic chamber 42 are set according to the combination of the light sources to be used in the measurement to be executed from now. In a case where the target temperature is determined in advance as an absolute numerical value, this step is unnecessary. After starting the energization of the deuterium lamp 411 and/or the tungsten lamp 412, the measurement execution unit 723 waits for a predetermined time until the lighting state of the lamp is stabilized, and then starts the energization of the heater 417 of the light source chamber 41 and the heater 427 of the spectroscopic chamber 42. Then, at predetermined time intervals, the temperatures of the light source chamber 41 and the spectroscopic chamber 42 are measured by the sensor 416 of the light source chamber 41 and the sensor 426 of the spectroscopic chamber 42, respectively, and the power supply amount is feedback-controlled to the heaters 417 and 427 based on the difference between the temperatures and the target temperature. When the feedback control is started, a measurement control unit 73 measures the sample according to the conditions described in the method file.

Conventionally, temperature adjustment of a spectrophotometer is generally uniformly set regardless of a combination of light sources used (turned on) at the time of measurement. For example, in the examples illustrated in FIGS. 4 and 5, in a case where the target temperature is determined on the basis of when only the deuterium lamp 411 in which the amount of generated heat is intermediate is turned on, the target temperature of the light source chamber 41 is room temperature +22.5° C., and the target temperature of the spectroscopic chamber 42 is room temperature +18° C. However, for example, in the measurement in which only the tungsten lamp 412 is turned on, even if the output of the heater 417 of the light source chamber 41 is maximized, the temperature can be raised only to 20° C., and it is impossible to adjust the temperature of the light source chamber 41 to room temperature +22.5° C. As described above, if the target temperature of the spectrophotometer is uniformly set regardless of the light source to be used, there is a case where the light source chamber 41 and the spectroscopic chamber 42 cannot be maintained at the target temperature. For example, in measurement in which both the deuterium lamp 411 and the tungsten lamp 412 are turned on, it is tentatively possible to adjust the temperature of the light source chamber 41 to room temperature +22.5° C. if the output of the heater of the light source chamber 41 is reduced and heating is stopped at 3.5° C., but it becomes impossible to adjust the temperature if the temperature rises by 3.5° C. or more from the temperature at the time of starting the apparatus (that is, the temperature used for setting the target temperature). That is, even if the temperature can be controlled, the followability to the variation of the room temperature is poor (the followable temperature range is narrow).

On the other hand, in the liquid chromatograph 1 of the present embodiment, since the target temperatures of the light source chamber 41 and the spectroscopic chamber 42 are set for each combination of the light sources used (that is, turned on) at the time of measurement, the temperature inside can be appropriately adjusted regardless of the combination of the light sources used for measurement.

The above-described embodiment are merely examples, and can be appropriately modified in accordance with the spirit of the invention.

Although the spectrophotometer used in the liquid chromatograph 1 has been described in the above embodiment, the same configuration as described above can be applied to a case where only the spectrophotometer is used or a case where the spectrophotometer is incorporated in another analysis device and used.

In the above embodiment, one set of sensors 416 and 426 and heaters 417 and 427 is disposed in each of the light source chamber 41 and the spectroscopic chamber 42, but a plurality of sets of sensors and heaters may be disposed according to the sizes of the light source chamber 41 and the spectroscopic chamber 42. A fan or the like for circulating heat from the heaters 417 and 427 may be disposed in the light source chamber 41 or the spectroscopic chamber 42.

In the above embodiment, the case where the individual target temperature is set for each of the light source chamber 41 and the spectroscopic chamber 42 has been described, but a common target temperature may be set for the light source chamber 41 and the spectroscopic chamber 42. A sensor and a heater may be provided not only in the light source chamber 41 and the spectroscopic chamber 42 but also in the flow cell 422, and another target temperature may be set in the flow cell 422. For example, when a cooled or heated liquid sample flows inside the flow cell 422, only the flow cell 422 is locally cooled or heated. In such a case, the flow cells 422 may be configured to be individually temperature-controlled.

In the above embodiment, the configuration including the deuterium lamp and the tungsten lamp as the light source has been described, but a spectrophotometer including another type of light source can also adopt the same configuration as described above. Further, a spectrophotometer including a plurality of light sources of the same type and capable of changing the amount of light applied to a sample according to the number of light sources to be turned on can also adopt the same configuration as described above. That is, the combination of the light sources in the above embodiment may include a plurality of light sources of the same type.

In the above embodiment, the spectrophotometer configured to irradiate a sample with light from the deuterium lamp 411 and the tungsten lamp 412 and detect transmitted light from the sample by wavelength separation has been described, but the configuration of the spectrophotometer can be appropriately changed according to the purpose of measurement. For example, the light emitted from the deuterium lamp 411 and the tungsten lamp 412 may be wavelength-separated, and the sample may be irradiated with light (monochromatic light) having one or more predetermined wavelengths. In that case, one having only one light detection element can be used instead of the photo-diode array 425. Further, not only transmitted light from the sample but also fluorescence, scattered light, and the like from the sample can be measured. In addition, in the above embodiment, the liquid sample eluted from the column 31 of the liquid chromatograph 1 is measured, but it can also be used for measurement of a gas sample or a solid sample. For example, in the case of a solid sample, a sample placing table or the like for fixing the solid sample at a predetermined position may be used.

[Aspects]

It is understood by those skilled in the art that the plurality of exemplary embodiments described above are specific examples of the following aspects.

(First Aspect)

A spectrophotometer according to a first aspect of the invention includes:
- a sample placement unit in which a sample to be analyzed is placed;
- a light source unit that includes a plurality of light sources, each of which irradiates a sample placed in the sample placement unit with light;
- a detection unit configured to detect light from the sample;
- a housing configured to accommodate the sample placement unit, the light source unit, and the detection unit;
- a storage unit in which information of a temperature value predetermined for each combination of one or a plurality of light sources among the plurality of light sources is stored;
- a light source designation accepting unit configured to accept designation related to a combination of one or a plurality of light sources to be turned on among the plurality of light sources;
- a target temperature setting unit configured to read the information of the temperature corresponding to the combination of one or a plurality of light sources accepted by the light source designation accepting unit from the storage unit and set the temperature value to a target temperature; and
- a temperature adjusting unit configured to maintain a temperature inside the housing at the target temperature.

The plurality of light sources may be light sources of the same type or light sources of different types.

As the sample placement unit, an appropriate one depending on the shape of the sample is used. For example, in the case of measuring a gas sample or a liquid sample, a flow cell or a standard cell is used as the sample placement unit, and in the case of measuring a solid sample, a sample stage is used as the sample placement unit.

As the temperature adjusting unit, for example, one including a heater that heats the inside of the housing, a temperature measurement unit that measures the temperature inside the housing, and an output adjustment unit that adjusts the output of the heater according to the difference between the temperature measurement unit and the target temperature is used.

The temperature value predetermined for each combination of the plurality of light sources is determined based on a degree of temperature rise inside the housing when each light source is turned on and a temperature adjustable range by the temperature adjusting unit.

The spectrophotometer according to the first aspect includes a light source unit including a plurality of light sources, and measures a sample by turning on one or a plurality of the light sources according to an absorption characteristic of a sample to be analyzed. In this spectrophotometer, when a combination of one or a plurality of light sources to be used for measurement of a sample is designated prior to measurement, information of a temperature value corresponding to the input combination of light sources is read from the storage unit and set to a target temperature. During the measurement, the temperature inside the housing is maintained at the target temperature by the temperature adjusting unit.

In the spectrophotometer of the first aspect, since the target temperature is set according to the combination of the light sources to be used, the temperature inside the spectrophotometer can be appropriately adjusted regardless of the combination of the light sources to be used for measurement.

(Second Aspect)

A spectrophotometer according to a second aspect of the invention is the spectrophotometer according to the first aspect, in which
- the plurality of light sources includes a deuterium lamp and a tungsten lamp, and
- the storage unit stores information of a temperature value in the case when only the deuterium lamp is turned on, a temperature value information in the case when only the tungsten lamp is turned on, and a temperature value information in the case when the deuterium lamp and the tungsten lamp are turned on.

The spectrophotometer according to the second aspect of the invention includes a deuterium lamp and a tungsten lamp. The deuterium lamp mainly emits light in the ultraviolet region, and the tungsten lamp mainly emits light in the visible region. Therefore, in the spectrophotometer of the second aspect, it is possible to perform measurement by irradiating a wide range of light from the ultraviolet region to the visible region according to the light absorption characteristic of the sample.

(Third Aspect)

A spectrophotometer according to a third aspect of the invention is the spectrophotometer according to the first aspect or the second aspect, in which
- the housing includes a light source housing portion that houses the light source unit and a detection unit housing portion that houses the detection unit,
- the temperature value is determined for each of the light source housing portion and the detection unit housing portion,
- the target temperature is set for each of the light source housing portion and the detection unit housing portion, and
- the temperature adjusting unit maintains each of the light source housing portion and the detection unit housing portion at the target temperature.

In the spectrophotometer of the third aspect, the housing includes a light source housing portion that houses the light source unit and a detection unit housing portion that houses the detection unit, and the target temperature is individually set for the light source housing portion and the detection unit housing portion. When the light source is turned on in the spectrophotometer, the temperature rise in the light source housing portion is larger than the temperature rise in the detection unit housing portion. Therefore, the target temperature of the light source housing portion is set to be higher than the target temperature of the detection unit housing portion. In the spectrophotometer of the second aspect, since the light source housing portion and the detection unit housing portion are individually maintained at the target temperature, the temperature can be more reliably controlled.

(Fourth Aspect)

A liquid chromatograph according to a fourth aspect of the invention includes the spectrophotometer according to any one of the first to third aspects.

In the liquid chromatograph, a spectrophotometer is widely used for identification and quantification of components contained in a sample. In the liquid chromatograph of the fourth aspect, the inside of the liquid chromatograph is appropriately temperature-controlled regardless of the type or combination of the light sources used for measurement, so that the sample can be accurately identified and quantified while drift, noise, and the like are suppressed.

REFERENCE SIGNS LIST

1 . . . Liquid Chromatograph
10 . . . Liquid Feeding Unit
11a . . . Container
12a . . . Liquid Feeding Pump
13 . . . Mixer
20 . . . Autosampler
21 . . . Temperature Control Mechanism
30 . . . Column Oven
31 . . . Column
32 . . . Temperature Control Mechanism
40 . . . Spectrophotometer
41 . . . Light Source Chamber
411 . . . Deuterium Lamp
412 . . . Tungsten Lamp
413 . . . Mirror
416 . . . Sensor
417 . . . Heater
42 . . . Spectroscopic Chamber
421 . . . Condenser Lens
422 . . . Flow Cell
423 . . . Slit
424 . . . Diffraction Grating
425 . . . Photodiode Array
426 . . . Sensor
427 . . . Heater
50 . . . System Controller
70 . . . Control and Processing Unit
71 . . . Storage Unit
72 . . . Analysis Program
721 . . . Measurement Condition Input Accepting Unit
722 . . . Method File Creation Unit
723 . . . Measurement Execution Unit
75 . . . Input Unit
76 . . . Display Unit

The invention claimed is:

1. A spectrophotometer comprising:

a sample placement unit in which a sample to be analyzed is placed;

a light source unit that includes a plurality of light sources, each of which irradiates a sample placed in the sample placement unit with light;

a detection unit configured to detect light from the sample;

a housing configured to accommodate the sample placement unit, the light source unit, and the detection unit;

a storage unit which stores, for each of a plurality of different combinations of one or more of the plurality of light sources including at least a designated combination defined as including two or more light sources, information of a corresponding temperature value predetermined for a corresponding combination of the one or more of the plurality of light sources;

a light source designation accepting unit configured to accept the designated combination to be turned on from the plurality of light sources;

a target temperature setting unit configured to read a temperature value corresponding to the designated combination and set the temperature value to a target temperature; and a temperature adjusting unit configured to maintain a temperature inside the housing at the target temperature, wherein the target temperature is associated with the designated combination.

2. The spectrophotometer according to claim 1, wherein the plurality of light sources includes a deuterium lamp and a tungsten lamp, and the storage unit stores information of a temperature value in the case when only the deuterium lamp is turned on, a temperature value in the case when only the tungsten lamp is turned on, and a temperature value in the case when the deuterium lamp and the tungsten lamp are turned on.

3. The spectrophotometer according to claim 1, wherein the housing includes a light source housing portion that houses the light source unit and a detection unit housing portion that houses the detection unit, the temperature value is determined for each of the light source housing portion and the detection unit housing portion, the target temperature is set for each of the light source housing portion and the detection unit housing portion, and the temperature adjusting unit maintains each of the light source housing portion and the detection unit housing portion at the target temperature.

4. A liquid chromatograph comprising the spectrophotometer according to claim 1.

* * * * *